(12) United States Patent
Hedin et al.

(10) Patent No.: US 7,423,988 B2
(45) Date of Patent: Sep. 9, 2008

(54) DYNAMIC RECONFIGURATION OF RESOURCES THROUGH PAGE HEADERS

(75) Inventors: John M. Hedin, Coon Rapids, MN (US); Douglas D. Weaver, Plymouth, MN (US); Santosh K. Sonbarse, Eden Praire, MN (US); William J. Mitchell, Eden Praire, MN (US); Michael J. Hermel, Waseca, MN (US); Donald R. Bauman, Waseca, MN (US); Jerry E. Toms, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 397 days.

(21) Appl. No.: 11/095,789

(22) Filed: Mar. 31, 2005

(65) Prior Publication Data

US 2006/0223572 A1 Oct. 5, 2006

(51) Int. Cl.
*H04B 7/212* (2006.01)
(52) U.S. Cl. .......... 370/322; 370/310; 370/319; 370/320; 370/321; 370/328; 370/329; 370/341; 455/422.1; 455/450; 455/451; 455/452.2
(58) Field of Classification Search .......... 370/310, 370/319–321, 322, 238, 329, 341; 455/422.1, 455/450, 451, 452.2
See application file for complete search history.

(56) References Cited

U.S. PATENT DOCUMENTS

| | | | |
|---|---|---|---|
| 4,569,042 A | 2/1986 | Larson | |
| 5,184,347 A | 2/1993 | Farwell et al. | |
| 5,276,691 A | 1/1994 | Kivari | |
| 5,544,222 A | 8/1996 | Robinson et al. | |
| 5,649,000 A * | 7/1997 | Lee et al. | 455/436 |
| 5,701,294 A | 12/1997 | Ward et al. | |
| 5,854,978 A | 12/1998 | Heidari | |
| 6,047,002 A | 4/2000 | Hartmann et al. | |
| 6,091,765 A | 7/2000 | Pietzold, III et al. | |

(Continued)

FOREIGN PATENT DOCUMENTS

EP 0936453 8/1999

(Continued)

OTHER PUBLICATIONS

U.S. Appl. No. 11/095,628, Toms et al.

(Continued)

*Primary Examiner*—Stephen M D'Agosta
(74) *Attorney, Agent, or Firm*—Fogg & Powers LLC

(57) ABSTRACT

Methods and systems for reconfiguring communications systems are provided. A communications system comprises one or more radio head interface modules and a call processing software module. The one or more radio head interface modules are adapted to communicate with the call processing software module. The call processing software module performs modulation and demodulation of voice and data streams using one or more air interface standards. The one or more radio head interface modules receive reconfiguration parameters from the call processing software module for one or more logical channels. The call processing software module and the one or more radio head interface modules communicate one or more pages of data samples to each other, each of the one or more pages of data samples having a page header. Reconfiguration parameters are contained in the page header.

8 Claims, 7 Drawing Sheets

U.S. PATENT DOCUMENTS

| | | | |
|---|---|---|---|
| 6,097,733 | A | 8/2000 | Basu et al. |
| 6,188,898 | B1 | 2/2001 | Phillips |
| 6,363,421 | B2 | 3/2002 | Barker et al. |
| 6,381,289 | B1 * | 4/2002 | Dutta ............ 375/335 |
| 6,463,060 | B1 | 10/2002 | Sato et al. |
| 6,496,546 | B1 | 12/2002 | Allpress et al. |
| 6,501,785 | B1 | 12/2002 | Chang et al. |
| 6,584,146 | B2 | 6/2003 | Bose et al. |
| 6,636,747 | B2 | 10/2003 | Harada et al. |
| 6,654,428 | B1 | 11/2003 | Bose et al. |
| 6,728,228 | B1 * | 4/2004 | Ostman et al. ............ 370/332 |
| 6,775,303 | B1 | 8/2004 | Rustad et al. |
| 6,775,305 | B1 | 8/2004 | Delvaux |
| 6,788,961 | B2 | 9/2004 | Repice et al. |
| 6,810,270 | B1 | 10/2004 | Grohn et al. |
| 6,876,864 | B1 | 4/2005 | Chapin |
| 6,889,354 | B2 | 5/2005 | Feldman et al. |
| 6,912,228 | B1 | 6/2005 | Dahlman et al. |
| 7,058,789 | B2 | 6/2006 | Henderson et al. |
| 7,069,574 | B1 | 6/2006 | Adams et al. |
| 7,099,687 | B1 | 8/2006 | Makela et al. |
| 7,116,682 | B1 | 10/2006 | Waclawsky et al. |
| 7,151,925 | B2 * | 12/2006 | Ting et al. ............ 455/418 |
| 7,190,682 | B2 | 3/2007 | Shepherd et al. |
| 7,203,488 | B2 | 4/2007 | Luneau |
| 2001/0024430 | A1 | 9/2001 | Sekine et al. |
| 2001/0031621 | A1 | 10/2001 | Schmutz |
| 2001/0037395 | A1 | 11/2001 | Sabat, Jr. et al. |
| 2002/0035633 | A1 | 3/2002 | Bose et al. |
| 2002/0093983 | A1 | 7/2002 | Newberg et al. |
| 2002/0169894 | A1 | 11/2002 | Takla |
| 2002/0186436 | A1 | 12/2002 | Mani et al. |
| 2002/0186674 | A1 | 12/2002 | Mani et al. |
| 2002/0187809 | A1 | 12/2002 | Mani et al. |
| 2002/0191565 | A1 | 12/2002 | Mani et al. |
| 2003/0036359 | A1 | 2/2003 | Dent et al. |
| 2003/0050098 | A1 | 3/2003 | D'Agati et al. |
| 2003/0142649 | A1 | 7/2003 | Taniguchi |
| 2004/0001429 | A1 | 1/2004 | Ma et al. |
| 2004/0005866 | A1 | 1/2004 | Igarashi |
| 2004/0033806 | A1 | 2/2004 | Daniel et al. |
| 2004/0042387 | A1 | 3/2004 | Geile |
| 2004/0132477 | A1 | 7/2004 | Lundby et al. |
| 2004/0156328 | A1 | 8/2004 | Walton et al. |
| 2004/0156449 | A1 | 8/2004 | Bose et al. |
| 2004/0198410 | A1 | 10/2004 | Shepherd et al. |
| 2004/0198453 | A1 | 10/2004 | Cutrer et al. |
| 2004/0209580 | A1 | 10/2004 | Bose et al. |
| 2005/0190855 | A1 | 9/2005 | Jin et al. |
| 2006/0034242 | A1 | 2/2006 | Proctor, Jr. |
| 2006/0141957 | A1 | 6/2006 | Fischer et al. |
| 2006/0222054 | A1 | 10/2006 | Conyers et al. |
| 2006/0227736 | A1 | 10/2006 | Conyers et al. |
| 2007/0032241 | A1 | 2/2007 | Busch et al. |

FOREIGN PATENT DOCUMENTS

| | | |
|---|---|---|
| EP | 1211817 | 6/2002 |
| WO | 0159993 | 8/2001 |
| WO | 2004047316 | 6/2004 |

OTHER PUBLICATIONS

U.S. Appl. No. 11/095,788, Conyers et al.
U.S. Appl. No. 11/094,848, Weaver et al.
U.S. Appl. No. 11/095,111, Hermel et al.
U.S. Appl. No. 11/095,112, Hedin et al.
U.S. Appl. No. 11/094,949, Hedin et al.
U.S. Appl. No. 11/095,113, Hedin et al.
U.S. Appl. No. 11/094,950, Hedin et al.
U.S. Appl. No. 11/094,947, Conyers et al.
U.S. Appl. No. 11/094,907, Conyers et al.
U.S. Appl. No. 11/095,150, Bauman et al.
U.S. Appl. No. 11/095,779, Hermel et al.

* cited by examiner

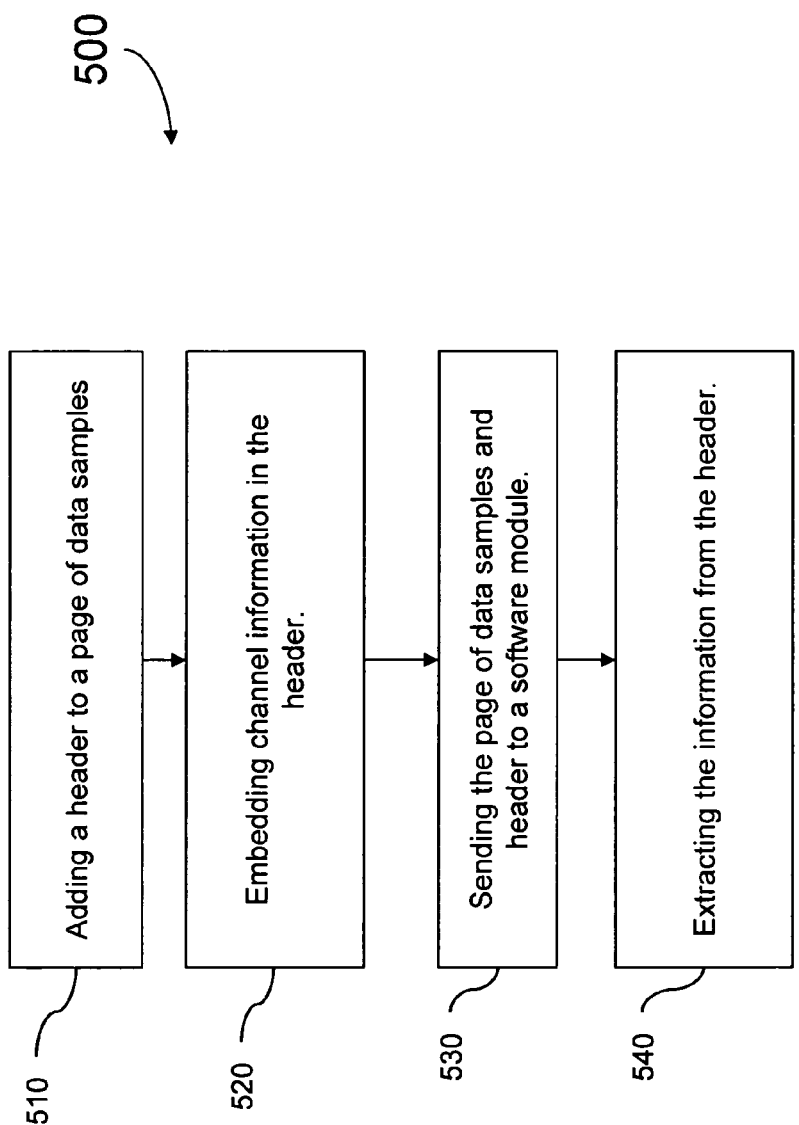

DYNAMIC RECONFIGURATION OF RESOURCES THROUGH PAGE HEADERS

CROSS REFERENCES TO RELATED APPLICATIONS

This application is related to the following co-pending United States patent applications filed on even date herewith, all of which are hereby incorporated herein by reference:

U.S. patent application Ser. No. 11/095,788 (entitled "DYNAMIC FREQUENCY HOPPING") and which is referred to here as the '672 Application;

U.S. patent application Ser. No. 11/095,628 (entitled "DYNAMIC DIGITAL UP AND DOWN CONVERTERS") and which is referred to here as the '673 Application;

U.S. patent application Ser. No. 11/094,848 (entitled "SIGNAL ENHANCEMENT THROUGH DIVERSITY") and which is referred to here as the '676 Application;

U.S. patent application Ser. No. 11/095,111 (entitled "SNMP MANAGEMENT IN A SOFTWARE DEFINED RADIO") and which is referred to here as the '677 Application;

U.S. patent application Ser. No. 11/095,112 (entitled "TIME STAMP IN THE REVERSE PATH") and which is referred to here as the '678 Application;

U.S. patent application Ser. No. 11/094,949 (entitled "BUFFERS HANDLING MULTIPLE PROTOCOLS") and which is referred to here as the '679 Application;

U.S. patent application Ser. No. 11/095,113 (entitled "TIME START IN THE FORWARD PATH") and which is referred to here as the '680 Application;

U.S. patent application Ser. No. 11/094,950 (entitled "LOSS OF PAGE SYNCHRONIZATION") and which is referred to here as the '681 Application;

U.S. patent application Ser. No. 11/094,947 (entitled "DYNAMIC REALLOCATION OF BANDWIDTH AND MODULATION PROTOCOLS" and which is referred to here as the '684 Application;

U.S. patent application Ser. No. 11/094,907 (entitled "DYNAMIC READJUSTMENT OF POWER") and which is referred to here as the '685 Application;

U.S. patent application Ser. No. 11/095,150 (entitled "METHODS AND SYSTEMS FOR HANDLING UNDERFLOW AND OVERFLOW IN A SOFTWARE DEFINED RADIO") and which is referred to here as the '686 Application; and U.S. patent application Ser. No. 11/095,779 (entitled "INTEGRATED NETWORK MANAGEMENT OF A SOFTWARE DEFINED RADIO SYSTEM") and which is referred to here as the '700 Application.

TECHNICAL FIELD

The following description relates to communication systems and in particular to wireless communication systems.

BACKGROUND

Many changes are taking place in the way wireless communication networks are being deployed. Some of the changes are being driven by the adoption of new mobile communications standards. The introduction of software defined radios to wireless telecommunications has led to the generation of software and hardware solutions to meet the new standards. Current mobile communication standards introduce physical and logical channels and pose new issues in the transport of information within the communication networks.

A software defined radio (SDR) uses software for the modulation and demodulation of radio signals. The use of reprogrammable software allows key radio parameters, such as frequency and modulation protocols to be modified without the need to alter the underlying hardware of the system. Additionally, SDRs allow a single device to support multiple configurations which previously would have required multiple hardware devices. One example of a software defined radio is the Vanu Software Radio produced by Vanu, Inc. (See U.S. Pat. No. 6,654,428).

One problem with current mobile communication standards is the number of distinct modulation standards that may be in use within a geographic region and the ability for wireless communication network providers to adapt their network hardware for the various protocols. Some modulation standards that wireless communication networks operate with include, but are not limited to, Advanced Mobile Phone System (AMPS), code division multiple access (CDMA), Wideband CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM). Purchasing hardware designed to operate with only a single standard results in idle resources at times when network demand for that modulation standard is low. To avoid the expenses associated with operating and maintaining hardware dedicated to each standard, there is a need in the art today for communications network hardware that is modulation standard independent and can be dynamically reconfigured to support modulation standards based on the current demands on the network and operate with multiple standards simultaneously. In some cases the need to reconfigure network hardware is determined by software application. Such software may also determine operational parameters, such as radio frequency channels, need to be reconfigured. In order to support dynamically reconfigurable communication network hardware, there is a need in the art today for a way for software applications to communicate operational parameters to network hardware.

For the reasons stated above, and for other reasons stated below that will become apparent to those skilled in the art upon reading and understanding the present specification, there is a need in the telecommunications industry for an effective method to pass operational parameters to reconfigurable network hardware.

SUMMARY

Embodiments of the present invention address the problem of effectively passing operational parameters to reconfigurable network hardware, as well as other problems and will be understood by reading and studying the following specification.

In one embodiment, a communications system is provided. The communications system comprises one or more radio head interface modules and a call processing software module. The one or more radio head interface modules are adapted to communicate with the call processing software module. The call processing software module performs modulation and demodulation of voice and data streams using one or more air interface standards. The one or more radio head interface modules receive reconfiguration parameters from the call processing software module for one or more logical channels. The call processing software module and the one or more radio head interface modules communicate one or more pages of data samples to each other, each of the one or more pages of data samples having a page header. Reconfiguration parameters are contained in the page header.

In yet another embodiment, a method for dynamic reconfiguration of resources is provided. The method comprises communicating channel information from a radio head interface module to a call processing software module, adding a header to a page of data samples, embedding channel reconfiguration parameters into the header, and sending the page of data samples and header to the call processing software module.

In yet another embodiment, a computer-readable medium having computer-executable instructions for dynamic reconfiguration of resources is provided. The method comprises communicating channel information from a radio head interface module to a call processing software module, adding a header to a page of data samples, embedding channel reconfiguration parameters into the header; and sending the page of data samples and header to the call processing software module.

In still another embodiment, a communication system is provided. The communications system comprises a software module, a radio head interface module, a means for embedding channel reconfiguration parameters into a page header of a page of data samples, a means for communicating the page of data samples and page header from the software module to the radio head interface module, a means for extracting the channel reconfiguration parameters from the header, and a means for reconfiguring a communications channel based on the channel reconfiguration parameters.

DRAWINGS

The present invention is more easily understood and further advantages and uses thereof more readily apparent, when considered in view of the description of the preferred embodiments and the following figures in which:

FIG. 5 is a flow chart of another method for practicing one embodiment of the present invention.

In accordance with common practice, the various described features are not drawn to scale but are drawn to emphasize features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods and systems to pass operational parameters to reconfigurable network hardware for mobile communications systems.

Embodiments of the present invention concern portions of a cellular telecommunications network that typically comprises one or more cellular antennas, a remote unit (also called a radio head unit) transmitting and receiving voice and/or data communications over the cellular antennas, and a base station (also commonly called a base transceiver station (BTS), or a server) that communicates data between the remote unit and a larger communication network (e.g. the public switched telephone network, or the Internet). One or more base stations are connected to a base station controller (BSC) which controls data communication flow in one or more connected base stations.

In some embodiments, communications between a BTS and a remote unit take place through two sets of data streams. Typically, forward logical channels carry data from the BTS through the remote unit to an end user device. Reverse logical channels carry data from end user devices through the remote unit to the BTS. Each of the data streams is assigned a radio frequency (RF) channel and a modulation protocol, which the remote unit uses to wirelessly communicate data with individual cellular devices.

Figure 1A:
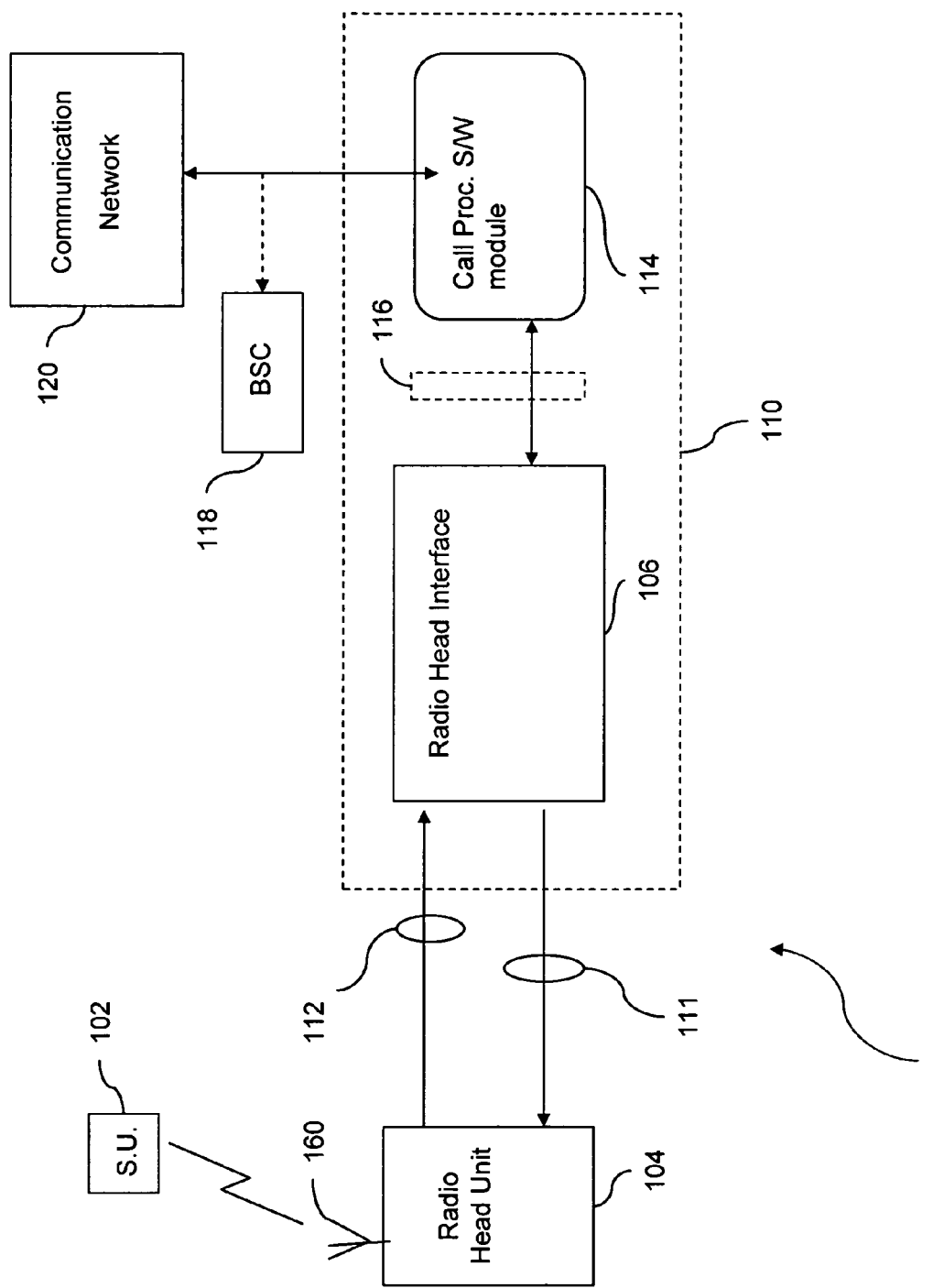
FIGS. 1A, 1B and 1C are block diagrams of one embodiment of a communications system of the present invention.

FIG. 1A is a block diagram of one embodiment of a communication system shown generally at 100. Communication system 100 includes one or more subscriber units 102 (or mobile devices 102) within a service area of a radio head unit 104. Radio head unit 104 is coupled to one or more servers 110 (or BTS 110) over one or more transport mediums 111, and 112. In one embodiment, transport mediums 111 and 112 comprise one or more high speed transport mediums. BTS 110 is connected to one or more communication networks 120 (e.g. public switched telephone network (PSTN), Internet, a cable network, or the like). In one embodiment, BTS 110 is connected to one or more communication networks through a base station controller (BSC) 118. In one embodiment, server 110 includes a call processing software module 114 (or call processing software 114) that interfaces between a radio head interface module 106 and one or more communication networks 120. In one embodiment, call processing software module 114 is comprised of one or more software applications. In one embodiment, call processing software module 114 also includes programming which implements an SDR with the BTS 110 and radio head unit 104 hardware, digitally performing waveform processing to modulate and demodulate radio signals transmitted and received, respectively, from cellular antennas 160. In one embodiment, call processing software module 114 is a Vanu, Inc., Vanu Software Radio.

In one embodiment, network 100 is a bidirectional network and as shown includes equipment for forward links (i.e. transmissions on forward logical channels from communications network 120 to mobile device 102) and reverse links (i.e. transmissions on reverse logical channels from mobile device 102 to communications network 120).

In some embodiments, additional reverse links are also provided for reverse logical channels that duplicate the reverse logical channels. In some embodiments, this set of duplicate reverse logical channels are called diversity channels. It should be understood that descriptions in this specification relating to embodiments of reverse logical channels also apply to such diversity channels. Further details pertaining to diversity channels are provided in the '676 Application incorporated herein by reference.

In one embodiment, BTS 110 communicates with radio head unit 104 through radio head interface module 106 (or radio head interface 106). Radio head interface 106 establishes high speed digital communication paths for two or more sets of base band data stream logical channels and all communication between BTS 110 and radio head unit 104 goes through radio head interface 106. Radio head interface 106 radio head unit 104, and call processing software module 114 both handle multiple types of modulation protocols, and in different embodiments, one or more of the logical channels transmit data using a different modulation protocol than another logical channel. In one embodiment, radio head interface 106 handles modulation protocols for one or more of, but not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), Orthogonal Frequency Division Multiplexing (OFDM), or any other appropriate modulation protocol. A modulation protocol is commonly also referred to as an air interface standard, a modulation standard, an air interface protocol, or an air interface modulation protocol. For each logical channel, BTS 110 performs modulation and demodulation of forward and reverse logical channel voice and data streams using one or more of the air interface standard protocols.

In one embodiment, radio head interface module 106 is coupled to BTS 110 through an interface device 116. In one embodiment, interface device 116 is one of, but not limited to a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface or a high speed parallel interface.

During initial configuration of communication system 100, parameters are loaded into radio head interface 106 for one or more of the protocols supported by radio head unit 104. Such parameters include, but are not limited to, valid bandwidths and RF channels associated with digital up-converter (DUC) and digital down-converter (DDC) coefficients necessary for radio head interface card 106 to implement the protocol. Additional details regarding the configuration and operation of DUCs and DDCs are discussed in the '673 and '677 Applications, incorporated herein by reference. In one embodiment, the parameters are stored in a table in memory in radio head interface 106.

Figure 1B:
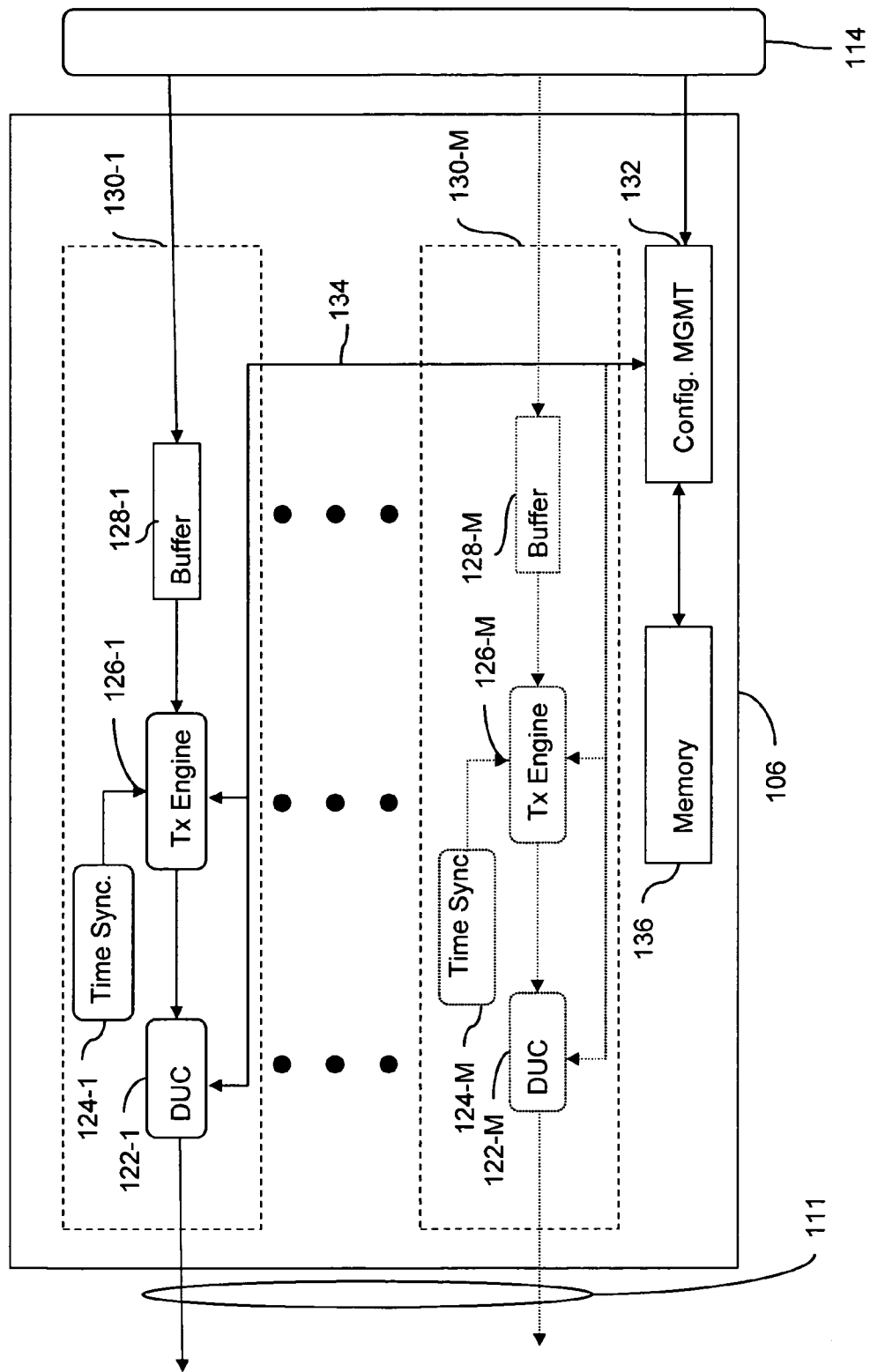

Embodiments of the present invention enable radio head interface 106 to receive logical channel reconfiguration parameters from call processing software module 114. In one embodiment, in the forward link, call processing software module 114 compiles voice and data information from communication networks 120 into collections of complex RF data samples. In one embodiment the collection of complex RF data samples forms a page of complex RF data samples wherein each page contains data samples for one forward logical channel. FIG. 1B illustrates one embodiment of a forward logical channel 130-1 data path. A radio head interface forward logical channel comprises a transmit buffer 128-1, a transmit engine 126-1, a DUC 122-1 and a time synchronizer 124-1. In operation, in one embodiment, transmit buffer 128-1 receives a page of complex data samples from call processing software 114. Transmit engine 126-1 removes the page of complex data samples from the transmit buffer 128-1 and sends the data samples to DUC 122-1. In one embodiment, transmit engine 126-1 holds the page of complex data samples until time synchronizer 124-1 determines that the current time matches a start time code embedded within the page. When the two times match, transmit engine 126-1 starts transmitting the page of complex data samples to DUC 122-1. In other embodiments, radio head interface 106 comprises a plurality of M forward logical channels 130-1 through 130-M each having transmit buffers 128-1 through 128-M, transmit engines 126-1 through 126-M, DUCs 122-1 through 122-M and time synchronizers 124-1 through 124-M, each processing data sample pages as described above.

In one embodiment, each page of complex RF data samples further comprises a page header generated by call processing software. In one embodiment, the page header prefixes the complex RF data samples. In one embodiment, the complex RF data samples consist of 256 quadwords. In one embodiment, each quadword is 64 bits long. In one embodiment, each quadword consists of two doublewords wherein each doubleword contains a single complex RF data sample. Although embodiments of the present invention are illustrated using 64 bit quadwords, it will be understood by those in the art that embodiments of the present invention apply to any finite length page containing digital data and embodiments are not limited by the bit lengths or formatting of digital words comprising the RF data samples.

Figure 2:
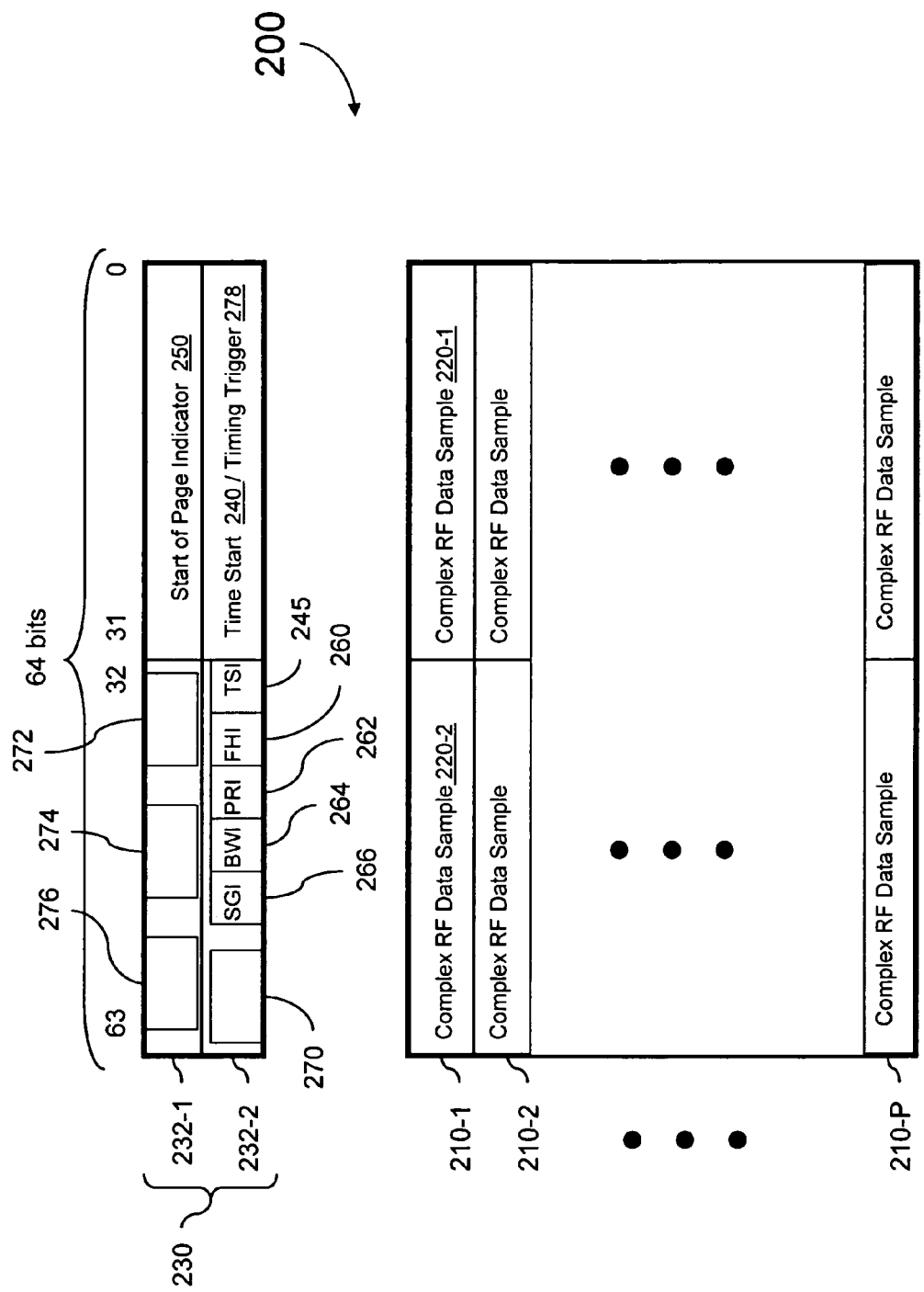
FIG. 2 is an illustration of a page of complex RF data samples for a forward logical channel, having a page header of the present invention.

FIG. 2 illustrates a transmit page 200 for a forward logical channel of one embodiment of the present invention. Transmit page 200 comprises a plurality of quadwords (210-1 to 210-P). In one embodiment each quadword 210-1 to 210-P is 64 bits in length and carries two complex RF data samples (such as data samples 220-1 and 220-2). In one embodiment, transmit page 200 contains 256 quadwords and 512 data samples as illustrated in FIG. 2. In alternate embodiments, each quadword may be each adapted to contain one data sample, two data samples, or multiple data samples. In one embodiment, page 200 includes a page header 230. In one embodiment page header 230 comprises two page header quadwords 232-1 and 232-2, each 64 bits in length. In one embodiment, quadword 232-1 contains a start of page indicator 250. In one embodiment, start of page indicator 250 is always comprised of a fixed 32 bit double word. In one embodiment, start of page indicator 250 comprises the 32 bit double word CCCCCCCCh. In one embodiment, quadword 232-2 contains a time start 240. In one embodiment, time start 240 is a 32 bit integer representing the time transmit engine 126-1 starts sending the first complex RF data sample of quadword 210-1 to DUC 122-1. In one embodiment time start 240 is contained in quadword 232-2 bits 0 to 31. In one embodiment, quadword 232-2 further contains a time start indicator (TSI) 245. In one embodiment, TSI 245 is contained in quadword 232-2 bit 32. In one embodiment, if TSI 245 is set (e.g. bit 32 is set to 1) then transmit engine 126-1 will observe the time indicated by time start 240. If TSI 245 is not set (e.g. bit 32 is set to 0) then transmit engine 126-1 will ignore the value of time start 240 and starts sending the first complex RF data sample of quadword 210-1 to DUC 122-1 immediately after the previous page is transmitted.

Embodiments of the present invention utilize the remaining unallocated bits within page header quadwords 232-1 and 232-2 to dynamically pass hardware configuration parameters from call processing software module 114 to radio head interface 106. Examples of hardware configuration parameters include, but are not limited to, signal bandwidth allocation parameters, RF frequency channel parameters, signal gain parameters, modulation protocol parameters, and the like.

In one embodiment, page header 230 contains a frequency hopping indicator (FHI) 260 to indicate when RF frequency channel parameters 270 are provided within page header 230. In one embodiment FHI 260 is contained in quadword 232-2 bit 33. In one embodiment RF frequency channel parameters are contained within a 16 bit word. In one embodiment RF frequency channel parameters are contained within quadword 232-2 bits 48 to 63. In one embodiment RF frequency channel parameters are contained within quadword 232-1 bits 48 to 63. In one embodiment RF frequency channel parameters are contained within quadword 232-1 bits 32 to 47. In one embodiment, if FHI 260 is set (e.g. bit 33 is set to 1) then radio head interface 106 reads the RF frequency channel parameters 270 from page header 230. If FHI 260 is not set (e.g. bit 33 is set to 0) then radio head interface 106 will ignore RF frequency channel parameters 270. In one embodiment, when FHI is set, then page header 230 also contains a timing trigger 278. In one embodiment timing trigger 278 is a 32 bit integer. In one embodiment, timing trigger 278 is contained in quadword 232-2 bits 0 to 31 in place of time start 240.

In one embodiment, page header 230 contains a protocol reconfiguration indicator (PRI) 262 to indicate when channel modulation protocol assignment parameters 272 are provided within page header 230. In one embodiment PRI 262 is contained in quadword 232-2 bit 34. In one embodiment channel modulation protocol assignment parameters 272 are contained within a 16 bit word. In one embodiment channel modulation protocol assignment parameters 272 are contained within quadword 232-1 bits 32 to 47. In one embodiment channel modulation protocol assignment parameters 272 are contained within quadword 232-2 bits 48 to 63. In one embodiment channel modulation protocol assignment parameters 272 are contained within quadword 232-2 bits 37 to 47. In one embodiment, if PRI 262 is set (e.g. bit 34 is set to 1) then radio head interface 106 reads the channel modulation protocol assignment parameters 272 from page header 230. If PRI 262 is not set (e.g. bit 34 is set to 0) then radio head interface 106 will ignore channel modulation protocol assignment parameters 272. In one embodiment, when PRI is set, then page header 230 also contains a timing trigger 278. In one embodiment timing trigger 278 is a 32 bit integer. In one embodiment timing trigger 278 is contained in quadword 232-2 bits 0 to 31 in place of time start 240.

In one embodiment, page header 230 contains a signal bandwidth indicator (BWI) 264 to indicate when signal bandwidth allocation parameters 274 are provided within page header 230. In one embodiment BWI 264 is contained in quadword 232-2 bit 35. In one embodiment signal bandwidth allocation parameters 274 are contained within a 16 bit word. In one embodiment signal bandwidth allocation parameters 274 are contained within quadword 232-1 bits 37 to 47. In one embodiment signal bandwidth allocation parameters 274 are contained within quadword 232-2 bits 48 to 63. In one embodiment signal bandwidth allocation parameters 274 are contained within quadword 232-2 bits 32 to 47. In one embodiment, if BWI 264 is set (e.g. bit 35 is set to 1) then radio head interface 106 reads the signal bandwidth allocation parameters 274 from page header 230. If BWI 264 is not set (e.g. bit 35 is set to 0) then radio head interface 106 will ignore signal bandwidth allocation parameters 274. In one embodiment, when BWI is set, then page header 230 also contains a timing trigger 278. In one embodiment timing trigger 278 is a 32 bit integer. In one embodiment timing trigger 278 is contained in quadword 232-2 bits 0 to 31 in place of time start 240.

In one embodiment, page header 230 contains a signal gain indicator (SGI) 266 to indicate when signal gain parameters 276 (also commonly referred to as signal amplitude or signal power) are provided within page header 230. In one embodiment SGI 266 is contained in quadword 232-2 bit 36. In one embodiment signal gain parameters 276 are contained within a 16 bit word. In one embodiment signal gain parameters 276 are contained within quadword 232-1 bits 37 to 47. In one embodiment signal gain parameters 276 are contained within quadword 232-2 bits 48 to 63. In one embodiment signal gain parameters 276 are contained within quadword 232-2 bits 32 to 47. In one embodiment, if SGI 266 is set (e.g. bit 36 is set to 1) then radio head interface 106 reads the signal gain parameters 276 from page header 230. If SGI 266 is not set (e.g. bit 36 is set to 0) then radio head interface 106 will ignore signal gain parameters 276. In one embodiment, when SGI is set, then page header 230 also contains a timing trigger 278. In one embodiment timing trigger 278 is a 32 bit integer. In one embodiment timing trigger 278 is contained in quadword 232-2 bits 0 to 31 in place of time start 240.

In other embodiments, page header 230 contains other parameters that are to be communicated from call processing software module 114 to radio head interface 106, along with an associate parameter indicator to notify radio head interface 106 that page header 230 contains the other parameters.

In the embodiments illustrated above, page header 230 contains indicators comprising one bit words which indicate when associated hardware configuration parameters are provided within page header 230. However, a person skilled in the art upon reading this specification would recognize that embodiments of this invention also include indicator words of any bit length and located in alternate positions within page header 230. In one embodiment, one or more of indicators 245, 260, 262, 264 and 266 are variable in length and in one embodiment the first X bits of the indicator word indicate the word length.

In operation, in one embodiment, call processing software module 114 outputs to logical channel 130-1's transmit buffer 128-1 a page 200 having complex data samples representing voice and data communications, and also having a page header 230 containing one or more parameter indicators such as, but not limited to FHI 260, PRI 262, BWI 264 and SGI 266. In one embodiment, transmit engine 126-1 removes page header 230, sending only the complex data samples representing voice and data communications to DUC 122-1. Transmit engine 126-1 further evaluates page header 230 for indicators (such as FHI 260, PRI 262, BWI 264 and SGI 266). In one embodiment, when transmit engine 126-1 identifies an indicator, then the associated parameters are further read from page header 230 and communicated to configuration management unit 132. Configuration management unit 132 then looks up associated DUC parameters from memory 136 to reconfigure DUC 122-1. In one embodiment, the page header 230 includes reconfiguration information for an associated reverse logical channel 140-1. In that case, transmit engine 126-1 communicates the reconfiguration information to configuration management unit 132 which then looks up associated DDC parameters to reconfigure DDC 142-1.

In one embodiment, DUC 122-1 and DDC 142-1 are each adapted with a buffer memory that holds the associated DUC/DDC parameters received from configuration management unit 132. In one embodiment, when page header 230 also contains timing trigger 278, the DUC/DDC parameters remain in the buffer memory until the timing trigger 278 event occurs. In one embodiment, based on the occurrence of the timing trigger 278 event, transmit engine 126-1 sends a synchronization signal to DUC 122-1 and DDC 142-1 to load the associated DUC/DDC parameters from the buffer memory into active registers.

In one embodiment, timing trigger 278 is a designated time based off of radio head interface 106's internal time count. When radio head interface 106's time count reaches the designated time, transmit engine 126-1 sends a signal to DUC 122-1 and DUC 142-1 to load the associated DUC/DDC parameters provided by configuration management unit 132 into active registers. In one embodiment, the timing trigger 278 is a designated trigger data sample that designates when to perform the reconfiguration, instead of a designated time. For example, in one embodiment the designated trigger data sample is the 32 bit hex quadword DDDDDDDDh. Transmit engine 126-1 scans data pages received from transmit buffer 128-1 for a designated trigger data sample DDDDDDDDh. Upon receipt of that data sample transmit engine 126-1 sends a signal to DUC 122-1 and DDC 142-1 to load the associated DUC/DDC parameters provided by configuration management unit 132 into active registers. Once the associated DUC/DDC parameters are loaded into active registers, logical channels 130-1 and 140-1 begin operation under the new configuration.

Additional details pertaining to the operation and configuration of DUC's and DDC's are provided in the '673 Application herein incorporated by reference. Additional details pertaining to dynamic frequency hopping are provided in the '672 Application herein incorporated by reference. Additional details pertaining to dynamic reallocation of signal bandwidth and modulation protocol reconfiguration are provided in the '684 Application herein incorporated by reference. Additional details pertaining to dynamic signal gain adjustments are provided in the '685 Application herein incorporated by reference.

Figure 1C:
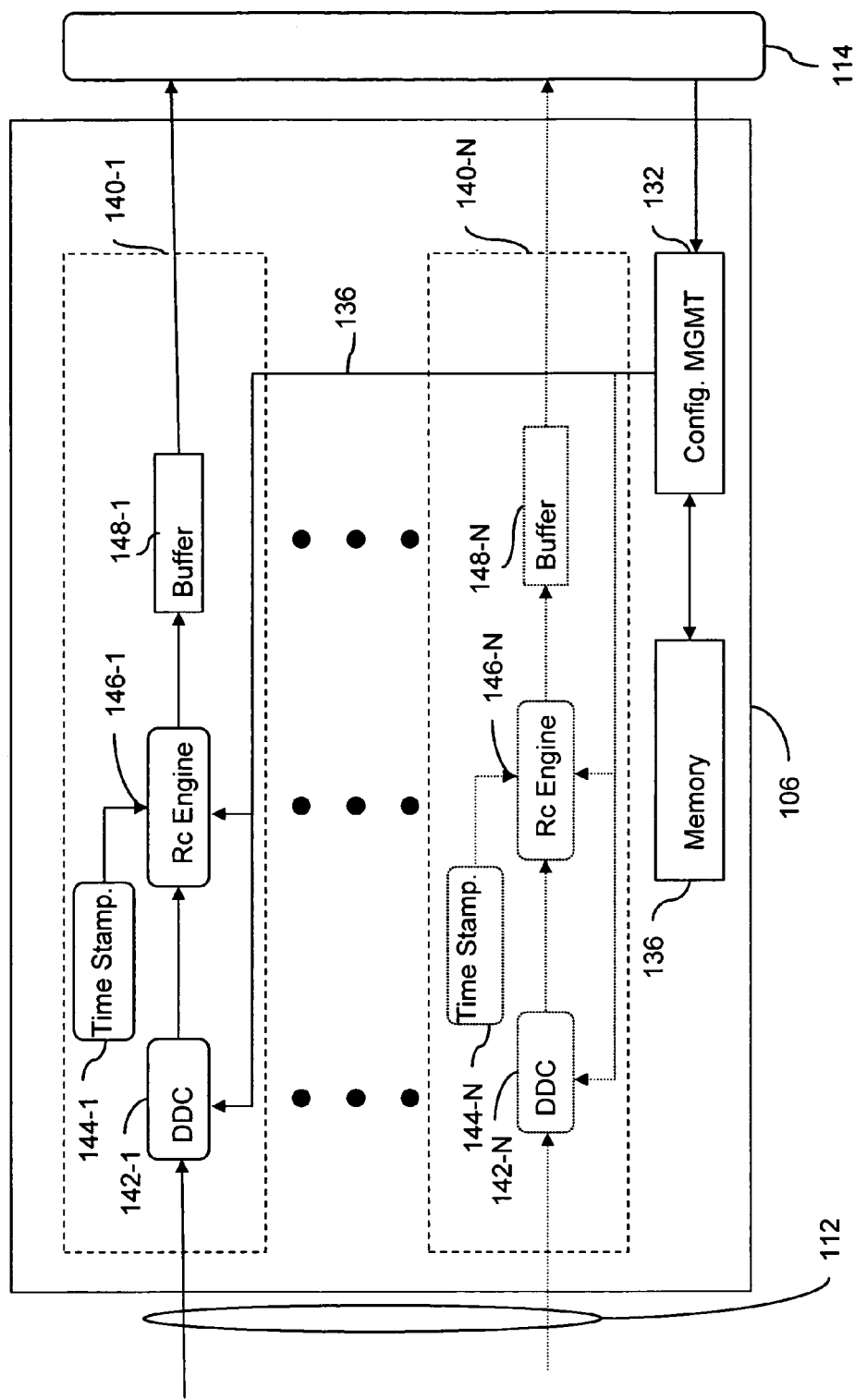

In one embodiment, a page header prefixes a page of complex RF data samples in the reverse link. FIG. 1C illustrates one embodiment of a reverse logical channel 140-1 data path. A radio head interface reverse logical channel comprises a receive buffer 148-1, a receive engine 146-1, a DDC 142-1 and a time stamper 144-1. In operation, in one embodiment, receive engine 146-1 receives complex RF data samples from DDC 142-1 and sends the complex RF data samples to receive buffer 148-1. In one embodiment, as receive buffer 148-1 receives the complex RF data samples, a page of complex RF data samples is formed in the buffer. When completed, the page of complex RF data samples is transmitted by radio head interface module 106 to call processing software module 114. In other embodiments, radio head interface 106 comprises a plurality of N reverse logical channels 140-1 through 140-N each having receive buffers 148-1 through 148-N, receive engines 146-1 through 146-N, DDCs 142-1 through 142-N and time stampers 144-1 through 144-M, each processing data sample pages as described above. Additional details pertaining to time stampers are provided in the '678 Application herein incorporated by reference.

Figure 3:
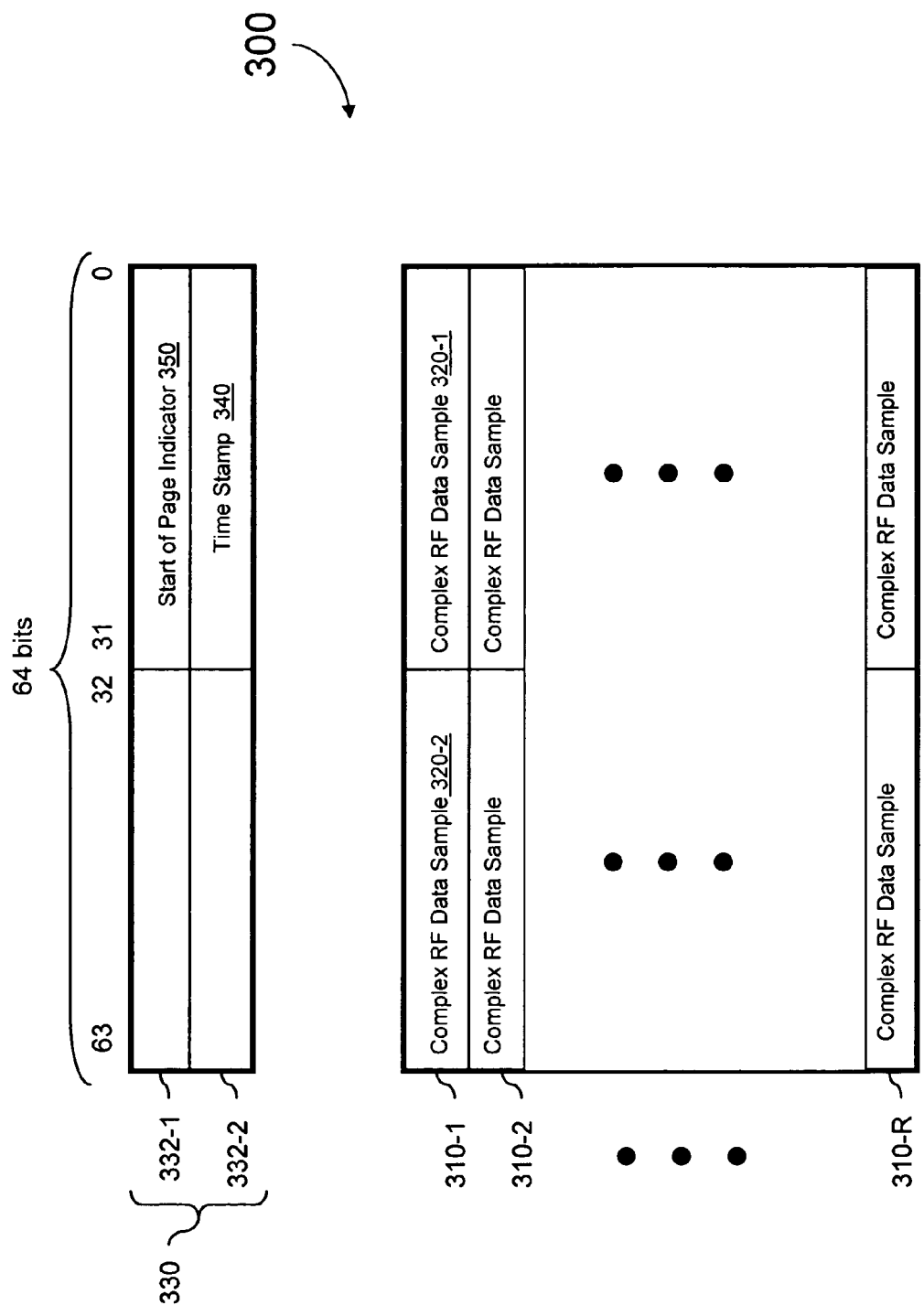
FIG. 3 is an illustration of a page of complex RF data samples for a reverse logical channel, having a page header of the present invention.

FIG. 3 illustrates a receive page 300 for a reverse logical channel 140-1 of one embodiment of the present invention. Receive page 300 comprises a plurality of quadwords (310-1 to 310-R). In one embodiment each quadword 310-1 to 310-R is 64 bits in length and carries two complex RF data samples (such as data samples 320-1 and 320-2). In one embodiment, receive page 300 contains 256 quadwords and 512 data samples. In one embodiment, page 300 includes a page header 330. In one embodiment page header 330 is added to page 300 by receive engine 146-1. In one embodiment page header 330 comprises two page header quadwords 332-1 and 332-2, each 64 bits in length. In one embodiment, quadword 332-1 contains a start of page indicator 350. In one embodiment, start of page indicator 350 is always comprised of a fixed 32 bit double word. In one embodiment, start of page indicator 350 comprises the 32 bit double word CCCCCCCCh. In one embodiment, quadword 332-2 contains a time stamp 340 representing the arrival time of a first complex RF data sample 320-1 of quadword 310-1. In one embodiment, the arrival time of complex RF data sample 320-1 is based on when it is received by receive engine 146-1 as determined by time stamper 144-1. In one embodiment, time stamp 340 is a 32 bit integer. In one embodiment time stamp 340 is contained in quadword 332-2 bits 0 to 31. In other embodiments of the present invention, remaining unallocated bits within page header quadwords 232-1 and 232-1 are utilized to dynamically pass information from radio head interface module 106 back to call processing software module 114. In one embodiment, the information includes, but is not limited to, configuration information for an associated set of forward and reverse logical channels.

Although page headers 230 and 330 are illustrated an described in terms of headers affixed to the top of a page of complex RF data samples, as would be readily recognized by one skilled in the art upon reading this specification, page headers 230 and 330 are not limited to only this position within the page of complex RF data samples. For example, in other embodiments, the hardware reconfiguration information can be appended in page headers appended to the bottom of a page of complex RF data samples.

Figure 4:
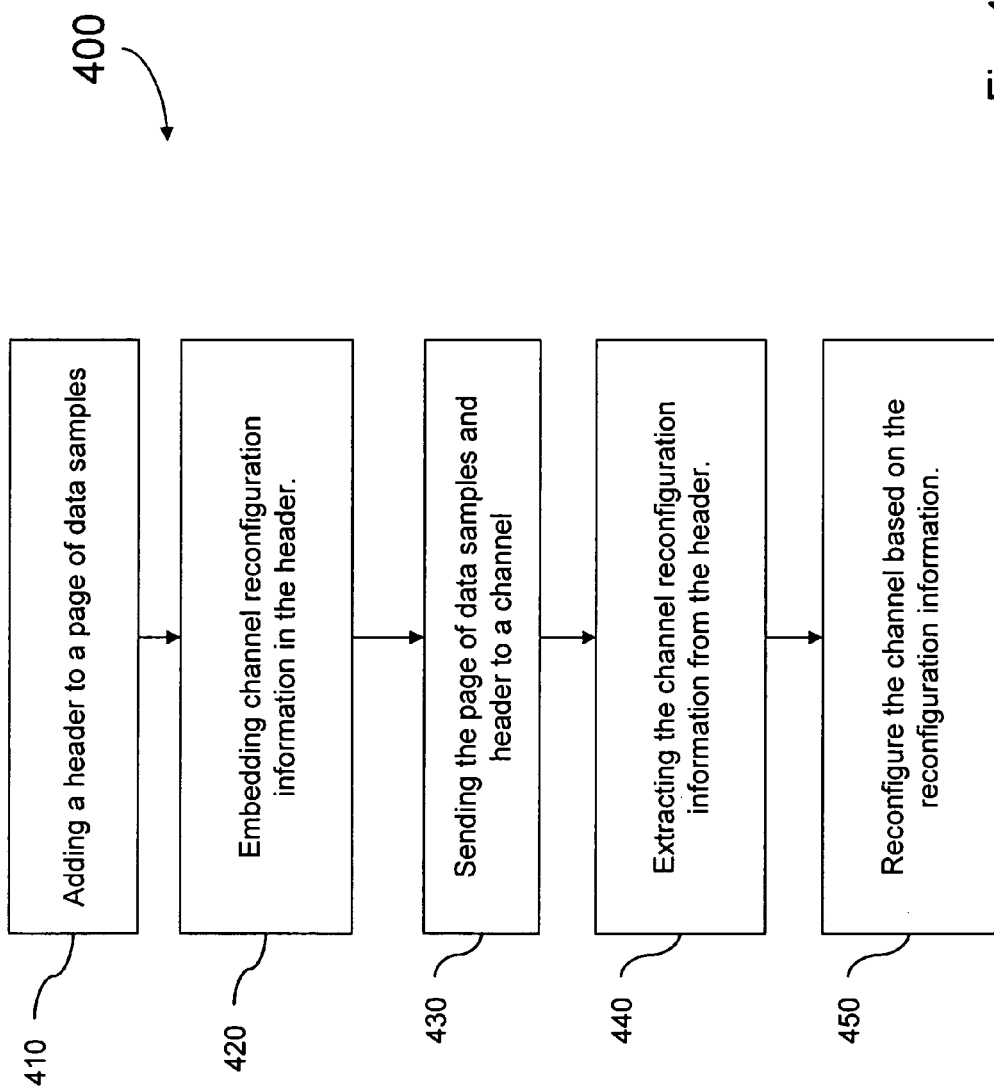
FIG. 4 is a flow chart of a method for practicing one embodiment of the present invention.

FIG. 4 illustrates a method 400 of one embodiment of the present invention. The method starts with adding a header to a page of data samples (410). The method continues with embedding channel reconfiguration information into the header (420), sending the page of data samples and header to a channel (430), extracting the channel reconfiguration information from the header (440), and reconfiguring the channel based on the reconfiguration information (450).

FIG. 5 illustrates another method 500 of one embodiment of the present invention. The method starts with adding a header to a page of data samples (510). The method continues with embedding information about a channel into the header (520), sending the page of data samples and header to a software module (530), and extracting the information from the header (540).

Several ways are available to implement the radio head interface module and server elements of the current invention. These include, but are not limited to, digital computer systems, programmable controllers, or field programmable gate arrays. Therefore other embodiments of the present invention are the program instructions resident on computer readable media which when implemented by such controllers, enable the controllers to implement embodiments of the present invention. Computer readable media include any form of computer memory, including but not limited to punch cards, magnetic disk or tape, any other magnetic data storage system, any optical data storage system, flash ROM, non-volatile ROM, PROM, E-PROM or RAM, or any other form of permanent, semi-permanent, or temporary memory storage system or device.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A radio head interface for a communications system, the radio head interface comprising:
   one or more digital frequency converters; and
   a configuration management unit, the configuration management unit adapted to receive reconfiguration parameters from the communications system for a digital frequency converter of the one or more digital frequency converters, the configuration management unit further adapted to reconfigure the digital frequency converter of the one or more digital frequency converters based on the reconfiguration parameters, wherein the reconfiguration parameters are contained within a page of data samples received by the radio head interface;
   wherein the page of data samples further comprises a page header, wherein the reconfiguration parameters are contained in the page header;
   wherein reconfiguration parameters include at least one of a frequency hopping indicator, RF frequency channel parameters, a protocol reconfiguration indicator, channel modulation protocol assignment parameters, a signal bandwidth indicator, signal bandwidth allocation parameters, a signal gain indicator, signal gain parameters, a timing trigger;
   wherein the timing trigger is a designated time; and
   wherein the designated time correlates to a time count internal to the radio head interface module.

2. A radio head interface for a communications system, the radio head interface comprising:
   one or more digital frequency converters; and
   a configuration management unit, the configuration management unit adapted to receive reconfiguration parameters from the communications system for a digital frequency converter of the one or more digital frequency converters, the configuration management unit further adapted to reconfigure the digital frequency converter of the one or more digital frequency converters based on the reconfiguration parameters, wherein the reconfiguration parameters are contained within a page of data samples received by the radio head interface;
   wherein the page of data samples further comprises a page header, wherein the reconfiguration parameters are contained in the page header;
   wherein reconfiguration parameters include at least one of a frequency hopping indicator, RF frequency channel parameters, a protocol reconfiguration indicator, channel modulation protocol assignment parameters, a signal bandwidth indicator, signal bandwidth allocation parameters, a signal gain indicator, signal gain parameters, a timing trigger;
   wherein when the page header includes RF frequency channel parameters, the page header also includes the frequency hopping indicator; and
   wherein when the page header includes RF frequency channel parameters and the frequency hopping indicator, the page header also includes the timing trigger.

3. A radio head interface for a communications system, the radio head interface comprising:
   one or more digital frequency converters; and
   a configuration management unit, the configuration management unit adapted to receive reconfiguration parameters from the communications system for a digital frequency converter of the one or more digital frequency converters, the configuration management unit further adapted to reconfigure the digital frequency converter of the one or more digital frequency converters based on the reconfiguration parameters, wherein the reconfiguration parameters are contained within a page of data samples received by the radio head interface;
   wherein the page of data samples further comprises a page header, wherein the reconfiguration parameters are contained in the page header;
   wherein reconfiguration parameters include at least one of a frequency hopping indicator, RF frequency channel parameters, a protocol reconfiguration indicator, channel modulation protocol assignment parameters, a signal bandwidth indicator, signal bandwidth allocation parameters, a signal gain indicator, signal gain parameters, a timing trigger;
   wherein when the page header includes channel modulation protocol assignment parameters, the page header also includes the protocol reconfiguration indicator; and
   wherein when the page header includes channel modulation protocol assignment parameters and the protocol reconfiguration indicator, the page header also includes the timing trigger.

4. A radio head interface for a communications system, the radio head interface comprising:
   one or more digital frequency converters; and
   a configuration management unit, the configuration management unit adapted to receive reconfiguration parameters from the communications system for a digital frequency converter of the one or more digital frequency converters, the configuration management unit further adapted to reconfigure the digital frequency converter of the one or more digital frequency converters based on the reconfiguration parameters, wherein the reconfiguration parameters are contained within a page of data samples received by the radio head interface;
   wherein the page of data samples further comprises a page header, wherein the reconfiguration parameters are contained in the page header;
   wherein reconfiguration parameters include at least one of a frequency hopping indicator, RF frequency channel parameters, a protocol reconfiguration indicator, channel modulation protocol assignment parameters, a signal bandwidth indicator, signal bandwidth allocation parameters, a signal gain indicator, signal gain parameters, a timing trigger;
   wherein when the page header includes signal bandwidth allocation parameters, the page header also includes the signal bandwidth indicator; and
   wherein when the page header includes signal bandwidth allocation parameters and the signal bandwidth indicator, the page header also includes the timing trigger.

5. A radio head interface for a communications system, the radio head interface comprising:
   one or more digital frequency converters; and
   a configuration management unit, the configuration management unit adapted to receive reconfiguration parameters from the communications system for a digital frequency converter of the one or more digital frequency converters, the configuration management unit further adapted to reconfigure the digital frequency converter of the one or more digital frequency converters based on the reconfiguration parameters, wherein the reconfiguration parameters are contained within a page of data samples received by the radio head interface;
   wherein the page of data samples further comprises a page header, wherein the reconfiguration parameters are contained in the page header;

wherein reconfiguration parameters include at least one of a frequency hopping indicator, RF frequency channel parameters, a protocol reconfiguration indicator, channel modulation protocol assignment parameters, a signal bandwidth indicator, signal bandwidth allocation parameters, a signal gain indicator, signal gain parameters, a timing trigger;

wherein when the page header includes signal gain parameters, the page header also includes the signal gain indicator; and wherein when the page header includes signal gain parameters and the signal gain indicator, the page header also includes the timing trigger.

6. A radio head interface for a communications system, the radio head interface comprising:

one or more digital frequency converters; and a configuration management unit, the configuration management unit adapted to receive reconfiguration parameters from the communications system for a digital frequency converter of the one or more digital frequency converters, the configuration management unit further adapted to reconfigure the digital frequency converter of the one or more digital frequency converters based on the reconfiguration parameters, wherein the reconfiguration parameters are contained within a page of data samples received by the radio head interface;

wherein the page of data samples further comprises a page header, wherein the reconfiguration parameters are contained in the page header;

wherein reconfiguration parameters include at least one of a frequency hopping indicator, RF frequency channel parameters, a protocol reconfiguration indicator, channel modulation protocol assignment parameters, a signal bandwidth indicator, signal bandwidth allocation parameters, a signal gain indicator, signal gain parameters, a timing trigger;

wherein a page of data samples further comprises a plurality of quadwords; and wherein one or more quadwords of the plurality of quadwords contains one or more data samples.

7. A radio head interface module, the module comprising:

a transmit buffer, the transmit buffer adapted to receive a data stream from a call processing software module and store the data stream as a page of data samples having a page header, the data stream comprising digital samples of a modulated radio frequency (RF) waveform representing voice and data communications;

a transmit engine;

a digital upconverter, the transmit engine adapted to transfer the page of data samples from the transmit buffer to the digital upconverter;

a configuration management unit adapted to receive reconfiguration parameters from the call processing software module, wherein the reconfiguration parameters are included within the page header;

a memory adapted with digital upconverter parameters;

wherein the configuration management unit is further adapted to access the memory to lookup associated digital upconverter parameters based on the reconfiguration parameters;

wherein the configuration management unit is further adapted to output the associated parameters to the digital up converter;

a receive buffer;

a receive engine; and a digital downconverter;

the receive engine adapted to transfer a data stream from the digital downconverter to the receive buffer, the receive buffer adapted to store the data stream as a page of data samples having a page header, the receive buffer further adapted to output the page of data samples to the call processing software;

the memory further adapted with digital downconverter parameters;

wherein the configuration management unit is further adapted to access the memory to lookup the associated digital downconverter parameters based on the reconfiguration parameters; and wherein the configuration management unit is further adapted to output the associated parameters to the digital downconverter.

8. The system of claim 7, wherein configuration information for an associated set of forward and reverse logical channels is included within the page header of a reverse logical channel of the one or more logical channels.

* * * * *